(12) United States Patent
McPheron et al.

(10) Patent No.: US 9,622,499 B2
(45) Date of Patent: Apr. 18, 2017

(54) BAKING APPARATUS

(75) Inventors: Alisa McPheron, Lima, OH (US); Amanda Wranik, Colorado Springs, CO (US)

(73) Assignee: Alisa McPheron, Lima, OH (US)

( * ) Notice: Subject to any disclaimer, the term of this patent is extended or adjusted under 35 U.S.C. 154(b) by 1316 days.

(21) Appl. No.: 12/757,216

(22) Filed: Apr. 9, 2010

(65) Prior Publication Data

US 2010/0260909 A1    Oct. 14, 2010

Related U.S. Application Data

(60) Provisional application No. 61/168,269, filed on Apr. 10, 2009.

(51) Int. Cl.
| | | |
|---|---|---|
| *A22C 7/00* | (2006.01) | |
| *A23L 1/01* | (2006.01) | |
| *A21B 3/13* | (2006.01) | |
| *A47J 37/01* | (2006.01) | |
| *A23L 5/10* | (2016.01) | |

(52) U.S. Cl.
CPC .............. *A23L 1/0121* (2013.01); *A21B 3/13* (2013.01); *A23L 5/13* (2016.08); *A23L 5/15* (2016.08); *A47J 37/01* (2013.01)

(58) Field of Classification Search
CPC .......... A21B 3/12; A47J 37/01; A23L 1/0121; A23L 5/13; A23L 5/15
USPC ................. 99/355, 324, 426, 340, 341, 444, 99/501–513; 219/725, 730, 731, 732
See application file for complete search history.

(56) References Cited

U.S. PATENT DOCUMENTS

| | | | |
|---|---|---|---|
| 153,569 | A | 7/1874 | Hutchins |
| 366,968 | A | 7/1887 | McClave |
| 434,688 | A | 8/1890 | Veley |
| 1,296,423 | A | 3/1919 | Neef |
| 1,334,930 | A | 3/1920 | Chadwick |
| 1,531,569 | A | 3/1925 | Rade |
| 1,567,234 | A | 12/1925 | Brucker |
| 2,028,671 | A | 1/1936 | Kollman |
| 2,030,344 | A | 2/1936 | Young |
| 2,454,054 | A | 11/1948 | Gibb |
| 2,529,354 | A | 11/1950 | Schroeder |
| 2,583,887 | A | 1/1952 | Schneeweiss |
| 2,607,338 | A | 8/1952 | Parenti |
| 3,473,489 | A | 10/1969 | Sargent |
| 3,741,427 | A | 6/1973 | Doyle |
| 3,946,893 | A | 3/1976 | Bowersmith |
| 4,395,015 | A | 7/1983 | Reardon |
| 4,644,858 | A | 2/1987 | Liotto et al. |
| 4,793,324 | A | 12/1988 | Caferro |
| 5,363,750 | A | 11/1994 | Miller et al. |
| 5,467,697 | A | 11/1995 | Hunziker |
| 5,537,917 | A | 7/1996 | Schiffer et al. |
| 5,676,050 | A | 10/1997 | Beck |
| 5,678,475 | A | 10/1997 | Villar Otero |
| 5,768,980 | A | 6/1998 | Degen |
| 7,478,588 | B2 | 1/2009 | Miller et al. |
| 2005/0217497 | A1* | 10/2005 | De'Longhi .................... 99/426 |

(Continued)

*Primary Examiner* — Phuong Nguyen

(74) *Attorney, Agent, or Firm* — Carlson, Gaskey & Olds

(57) ABSTRACT

A baking apparatus includes a sleeve having a base, a sidewall, and a lip. The sidewall protrudes upwardly from said base. The lip is positioned on an opposite end of the sidewall from the base. The sidewall establishes a cutout. The base, the sidewall and the cutout define a reservoir.

20 Claims, 5 Drawing Sheets

(56) References Cited

U.S. PATENT DOCUMENTS

2005/0217498 A1* 10/2005 Miller et al. .................. 99/426
2007/0090103 A1*  4/2007 France et al. ................ 219/400
2008/0060530 A1*  3/2008 Tetreault et al. ............. 99/355

* cited by examiner

BAKING APPARATUS

CROSS-REFERENCE TO RELATED APPLICATION

This application claims priority to U.S. Provisional Application No. 61/168,269, filed Apr. 10, 2009.

BACKGROUND OF THE DISCLOSURE

This disclosure generally relates to a baking apparatus, and more particularly to a sleeve for a baking apparatus.

Many baked goods, including cheesecake, custards, cakes, puddings, casseroles, and soufflés, are commonly prepared in a water bath baking process. A water bath baking process involves pouring a batter of food into a container. The container is next submerged into a separate container of hot water. The container of hot water (e.g., the water bath) bakes the batter. The water bath maintains an even, low moisture heat throughout the batter to evenly cook the baked good.

A springform pan is commonly used in a water bath baking process to prepare a cheesecake, for example. Cheesecake batter is poured into the springform pan, and the springform pan is subsequently submerged in a water bath. The uniform temperature of the water bath more evenly bakes the cheesecake as compared to oven baking. The uniform temperature of the water bath provides a relatively even texture to the cheesecake.

Many springform pans include sides that detach from a base to allow removal of a baked good from the springform pan without damaging the structure of the baked good. Many chefs wrap the springform pan in aluminum foil prior to submerging the springform pan into the water bath. The aluminum foil is intended to reduce the amount of water leakage into the springform pan during the water bath baking process.

SUMMARY OF THE DISCLOSURE

A baking apparatus includes a sleeve having a base, a sidewall, and a lip. The sidewall protrudes upwardly from the base. The lip is positioned on an opposite end of the sidewall from the base. The sidewall establishes a cutout. The base, the sidewall and the cutout define a reservoir.

A baking apparatus includes a sleeve that defines a reservoir and a pan that is nested within the reservoir. The sleeve is generally flexible to at least partially conform to a shape of the pan.

A method for preparing a baked good with a baking apparatus having an elastomeric sleeve and a pan includes nesting the pan within the elastomeric sleeve to assemble the baking apparatus, and submerging the baking apparatus into a water bath.

The various features and advantages of this disclosure will become apparent to those skilled in the art from the following detailed description. The drawings that accompany the detailed description can be briefly described as follows.

DETAILED DESCRIPTION OF THE EXAMPLE EMBODIMENTS

Figure 1:
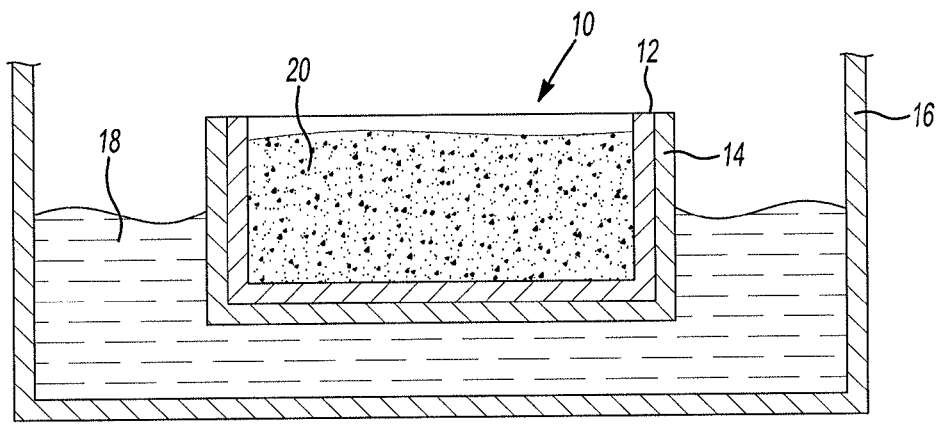
FIG. 1 illustrates an example baking apparatus.

FIG. 1 illustrates an example baking apparatus 10 that includes a pan 12 and a sleeve 14. The baking apparatus 10 is selectively partially submerged in a container 16 that is separate from the pan 12. The container 16 includes a water bath 18 used to cook a baked good, as is further discussed below. The pan 12 holds a batter 20 of a baked good, such as cheesecake batter, for example. For purposes of this disclosure, the batter 20 could also include a crust portion received within the pan 12. Although the various features and examples disclosed herein are illustrated with reference to cheesecake, a person of ordinary skill in the art would understand that the baking apparatus 10 may be utilized to prepare any baked good, including, but not limited to, custards, flourless cakes, sauces, mousses, puddings, casseroles, or any other delicate food dishes.

In one example, the pan 12 is a springform pan. However, a person of ordinary skill in the art having the benefit of this disclosure would understand that the pan 12 could include any type of baking pan. The actual size and shape of the pan 12 and the sleeve 14 will vary depending upon design specific parameters, including but not limited to, the desired size and shape of the baked good. That is, the actual dimensions of the pan 12 and the sleeve 14 are not critical to this disclosure. The sleeve 14 generally surrounds the pan 12, and conducts the heat of the water bath 18 to evenly cook the batter 20.

Figure 2:
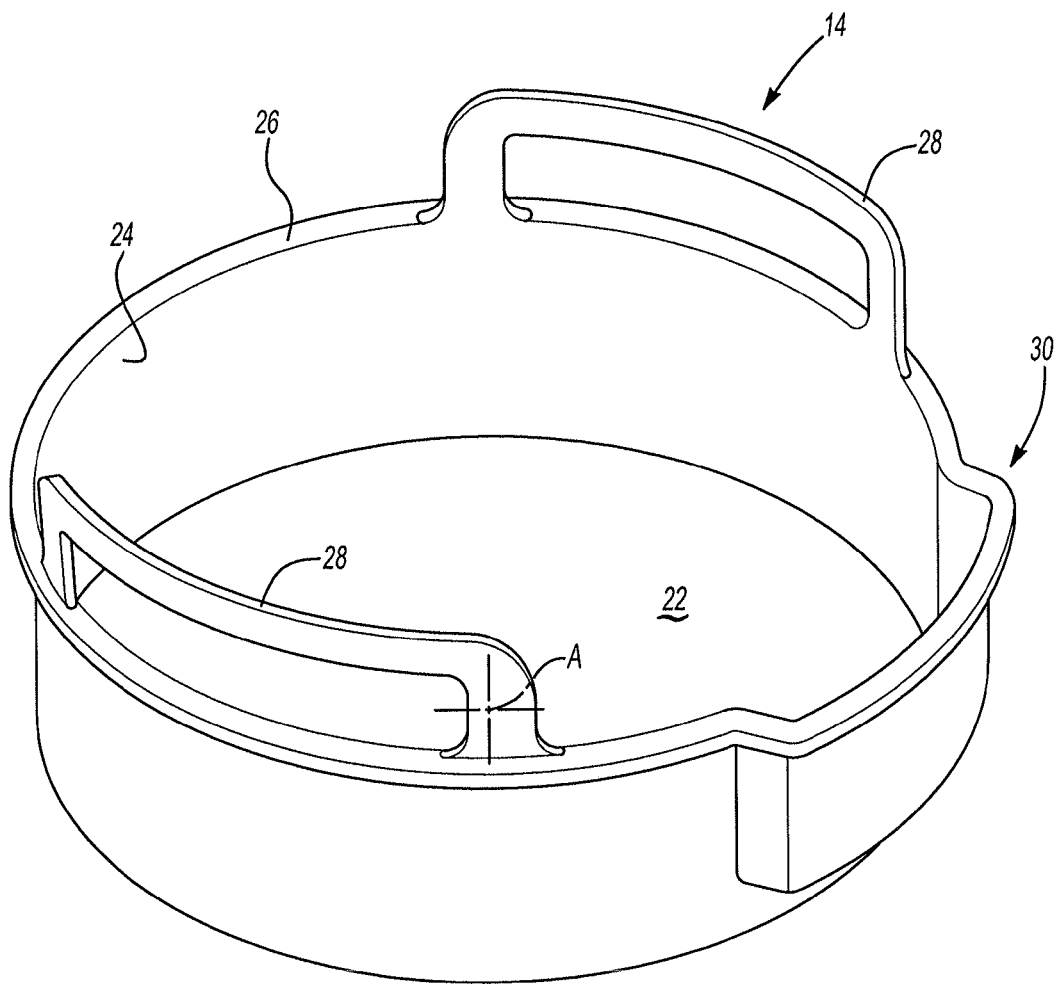
FIG. 2 illustrates an example sleeve for use with the baking apparatus illustrated in FIG. 1.

FIG. 2 illustrates an example sleeve 14 for use within the baking apparatus 10. The example sleeve 14 includes a base 22 and a sidewall 24. The sidewall 24 protrudes upwardly from the base 22 and generally establishes an outer perimeter of the sleeve 14. The base 22 and the sidewall 24 are formed as a single, continuous piece with no mechanical attachments between the two parts. For example, the sleeve 14 is extruded to form a single, continuous piece. The pan sleeve 14 also includes an open top.

Figure 3A:
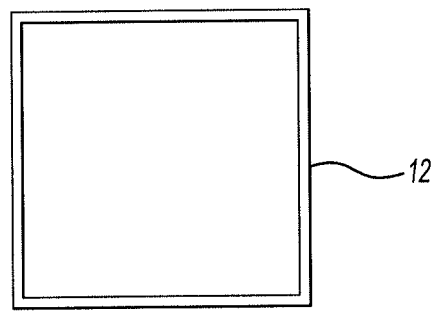
FIGS. 3A-3C illustrate various shapes of a pan for use with the example baking apparatus depicted in FIG. 1.
Figure 3B:
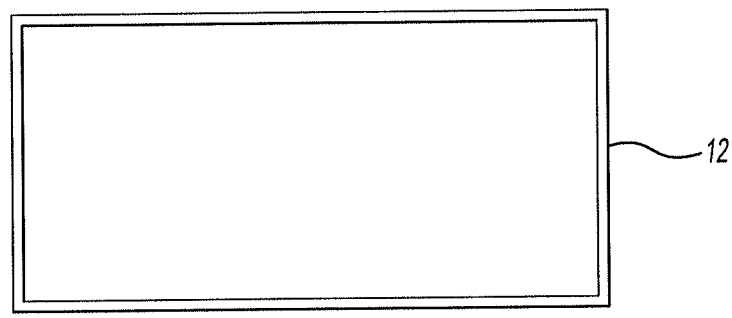
Figure 3C:
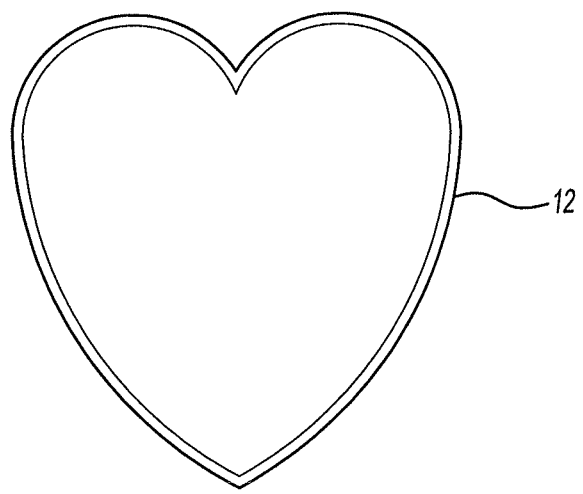

In the example depicted in FIG. 2, the sleeve 14 is generally circular in shape. A person of ordinary skill in the art having the benefit of this disclosure would understand that the size and the shape of the sleeve 14 is dependent upon the size and the shape of the pan 12 that is nested within the sleeve 14. For example, by way of several non-limiting examples, the pan 12 could include a circular shape, a square shape (See FIG. 3A), a rectangular shape (See FIG. 3B), a heart shape (See FIG. 3C), or any other shape. The actual shape of the sleeve 14 would directly mirror the shape of the pan 12 of the baking apparatus 10, and its size would depend upon the size of the pan 12.

Figure 4A:
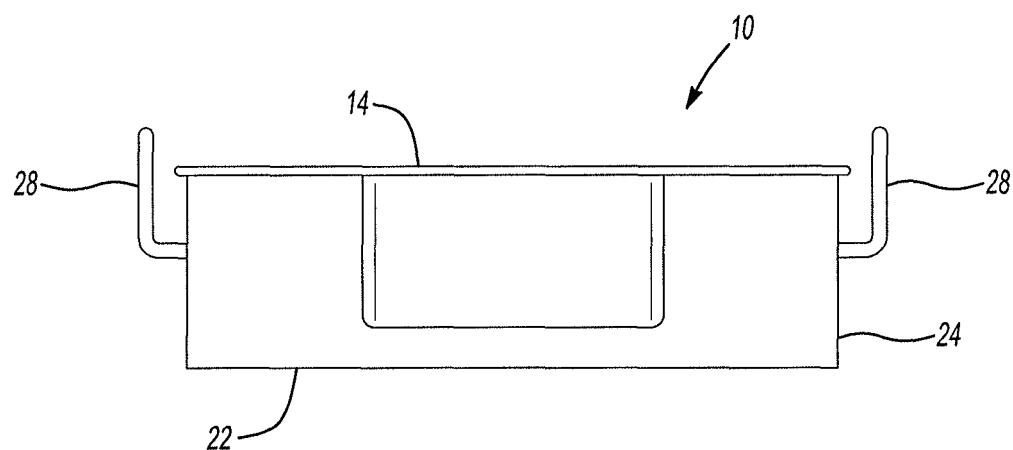
FIG. 4A illustrates another example sleeve for use with a baking apparatus.
Figure 4B:
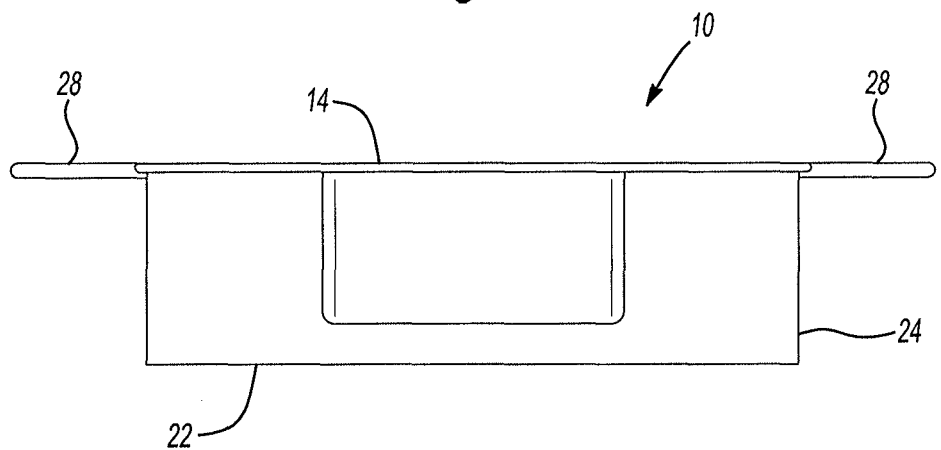
FIG. 4B illustrates yet another example sleeve for use with a baking apparatus.

The sidewall 24 of the sleeve 14 includes a lip 26 positioned on an opposite side of the sidewall 24 from the base 22. The lip 26 extends about the entire periphery of the sidewall 24. In this example, handles 28 extend from the lip 26 of the sidewall 24 in a direction opposite from the base 22, and are positioned on diametrically opposing sides of the sidewall 24. In another example, the handles 28 extend transversely from the sidewall 24 (See FIG. 4A). The handles 28 could also extend from other locations of the sleeve 14 in addition to the lip 26. For example, the handles 28 could protrude directly from the sidewall 24 of the sleeve 14 (See FIG. 4B).

Although two handles 28 are depicted in FIG. 2, the sleeve 14 could include any number of handles 28. The handles 28 aid in handling and transporting the sleeve 14, and further aid in removal of the baking apparatus 10 from a water bath 18. In one example, each of the base 22, the sidewall 24 and the handles 28 are extruded as a single, continuous piece having no mechanical attachments.

The sleeve 14 is exposed to relatively high temperatures when submerged into the water bath 18 (see FIG. 1). Therefore, the sleeve 14 is water resistant and heat resistant. In one example, the sleeve 14 is a thermoplastic, elastomeric material. In another example, the sleeve 14 is a thermoset, elastomeric material. In one non-limiting example, the material of the sleeve 14 includes Tufel II 94305 resin available from Momentive Performance Materials in Albany, N.Y. A person of ordinary skill in the art having the benefit of this disclosure would understand that other materials are within the scope of this disclosure.

The material of the sleeve 14 provides insulative properties. Therefore, once partially submerged into a water bath 18, the sleeve 14 conducts the heat of the water bath and evenly distributes the heat throughout the batter 20 of the baked good.

Figure 5A:
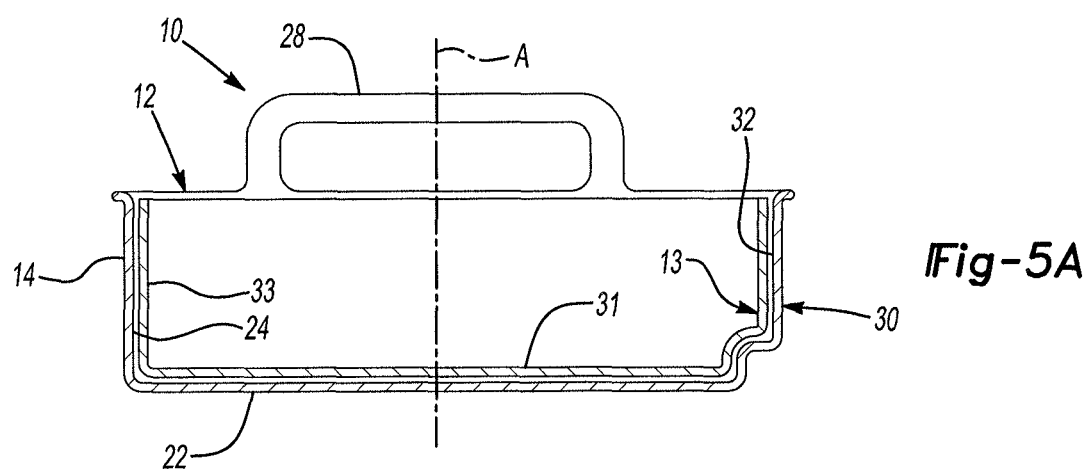
FIG. 5A illustrates a cross-sectional view of another example baking apparatus.
Figure 5B:
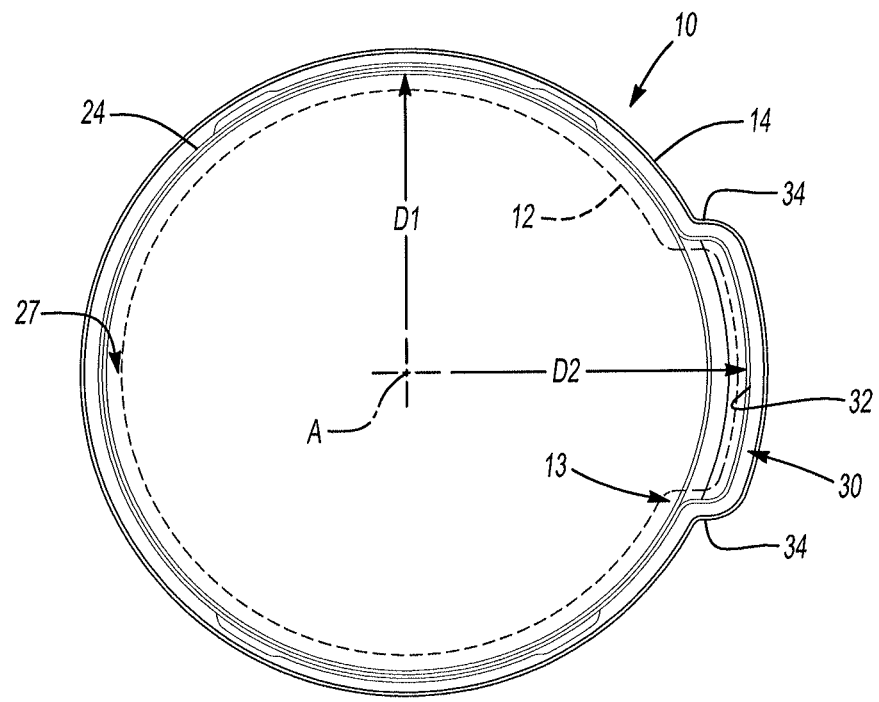
FIG. 5B illustrates a top view of the baking apparatus depicted in FIG. 4A.

Referring to FIGS. 5A and 5B, the sidewall 24 is circumferentially disposed about an axis A and is positioned at a first distance D1 from the axis A. The axis A extends through the center of the base 22 of the sleeve 14 (i.e., out of the page as depicted in FIG. 5B). That is, the axis A represents the central axis of the base 22. The sidewall 24 of the sleeve 14 may include a cutout 30 having a first wall portion 32 that is positioned a second distance D2 from the axis A. The second distance D2 is greater than the first distance D1, in this example.

Figure 5C:
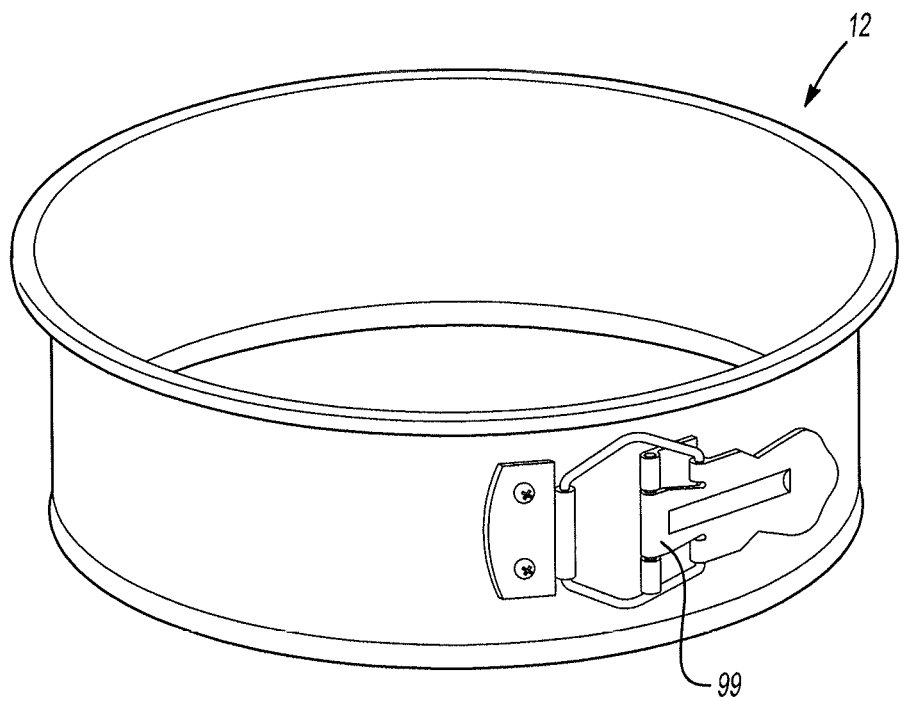
FIG. 5C illustrates an exemplary springform pan that may be used as part of a baking apparatus.

In the illustrated example, the wall portion 32 of the cutout 30 is positioned radially outward from the sidewall 24. The sidewall 24 and the cutout 30 form a continuous, non-interrupted piece, and are connected by second wall portions 34 that extend between the sidewall 24 and the first wall portion 32 of the cutout 30. The cutout 30 accommodates a protrusion 13 of the pan 12, such as a clip, latch, or other device that is nested within the sleeve 14. For example, where the pan 12 is a springform pan, the cutout 30 accommodates a cam clip 99 of the springform pan (see FIG. 5C).

The sleeve 14 is dimensioned to nest a pan 12 within a reservoir 27 of the sleeve 14. The base 22 and the sidewall 24 define the reservoir 27, which generally represents an interior of the sleeve 14. The sleeve 14 surrounds and is in contact with, or very near contact to, at least one wall of the pan 12 when the pan 12 is nested within the reservoir 27 of the sleeve 14. For example, a floor 31 of the pan contacts the base 22 of the sleeve 14 when nested. In another example, a wall 33 of the pan 12 contacts the sidewall 24 of the sleeve 14 when nested. In still another example, both the floor 31 and the wall 33 of the pan 12 are in direct contact with, or very near contact to, the base 22 and the sidewall 24, respectively, where the pan 12 is nested within the sleeve 14.

The actual dimensions of the sleeve 14 will vary depending on the size and shape of the pan 12 used with the baking apparatus 10. The sleeve 14 is also generally flexible such that it can at least partially stretch and form about the pan 12.

Figure 6:
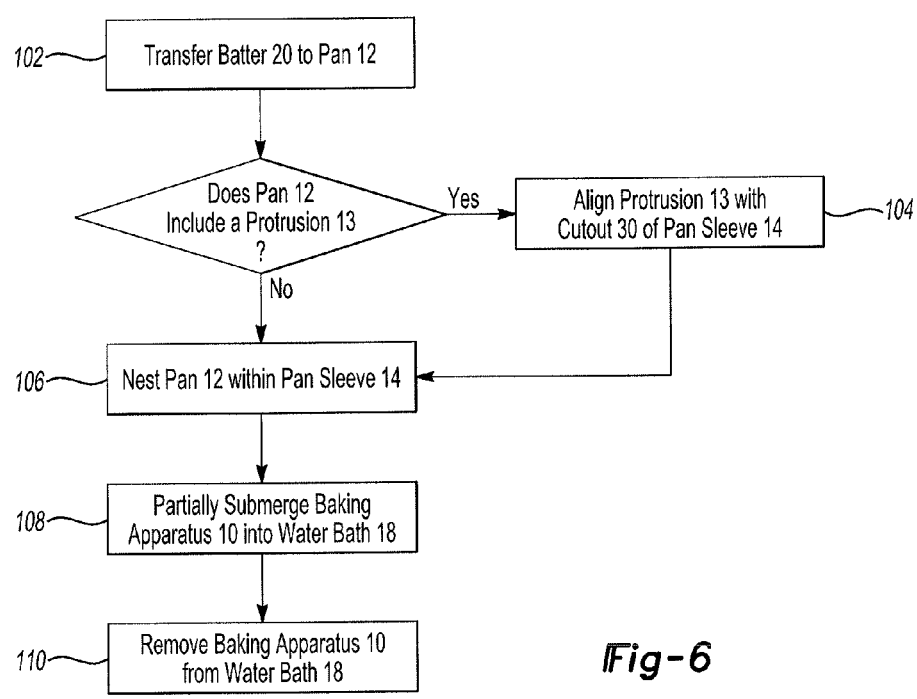
FIG. 6 illustrates an example method for preparing a baked good.

An example method 100 for preparing a baked good utilizing a baking apparatus 10 as described above is illustrated in FIG. 6 (with continued reference to FIGS. 1-4). The method begins at step block 102 when a batter 20 is transferred to a pan 12. For example, the batter 20 may include a cheesecake batter, a flourless cake batter, or any other batter for a baked good. In addition, where the baked good is a cheesecake, the pan 12 is a springform pan, for example.

Where the pan 12 includes a protrusion 13, such as a cam clip, the protrusion 13 of the pan 12 is aligned with the cutout 30 of the sidewall 24 of the sleeve 14 at step block 104 prior to nesting the pan 12 within the reservoir 27. Next, at step block 106, the pan 12 is nested within the reservoir 27 of the sleeve 14. The sleeve 14 is adapted to receive the size and shape of the particular pan 12 used to prepare the baked good. The sleeve 14 provides a barrier from water intrusion from the water bath 18 through the wall 33 of the pan 12. Alternatively, in one example, step blocks 104 and 106 can be performed prior to step block 102, such that the batter 20 is added to the baking apparatus 10 after the pan 12 is nested within the sleeve 14.

The baking apparatus 10, which includes the pan 12 nested within the sleeve 14, is next partially submerged into a container 16 holding a water bath 18 at step block 108. The water bath 18 includes hot water. A worker of ordinary skill in the art having a benefit of this disclosure would understand how to prepare a water bath 18 that is the appropriate size and temperature to cook a baked good.

The baking apparatus 10 is maintained within the water bath 18 until the batter 20 is evenly baked. The sleeve 14 evenly distributes the heat of the water bath 18 to provide a baked good that is smooth and evenly textured. The baking apparatus 10 is removed from the water bath 18 after a predetermined amount of time at step block 110. A work of ordinary skill in the art having the benefit of this disclosure would understand the amount of time necessary to properly cook the baked good. In one example, the handles 28 of the sleeve 14 are utilized to remove the baking apparatus 10 from the water bath 18.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A baking apparatus, comprising:
    an elastomeric sleeve that defines a reservoir;
    a springform pan configured to receive a batter and being nested within said reservoir, said elastomeric sleeve flexibly conforming to a shape of said springform pan to evenly distribute heat throughout said batter; and
    a container that is configured to hold a water bath, wherein said sleeve and said springform pan are at least partially submerged into said water bath of said container.

2. The baking apparatus as recited in claim 1, wherein said elastomeric sleeve includes a base, a sidewall that protrudes upwardly from said base, and a lip positioned on an opposite end of said sidewall from said base, wherein said sidewall establishes a protrusion, and said base, said sidewall and said protrusion define a reservoir.

3. The apparatus as recited in claim 2, wherein said sleeve includes handles that extend from said lip in a direction opposite from said base.

4. The apparatus as recited in claim 3, wherein said handles include a first handle and a second handle generally positioned on diametrically opposing sides of said sidewall.

5. The apparatus as recited in claim 3, wherein said base, said sidewall and said handles are a single, continuous piece with no mechanical attachments.

6. The apparatus as recited in claim 2, comprising handles that protrude from said sidewall.

7. The apparatus as recited in claim 2, wherein said base and said sidewall are a single, continuous piece with no mechanical attachments.

8. The apparatus as recited in claim 2, wherein said protrusion is positioned radially outward from said sidewall.

9. The apparatus as recited in claim 2, wherein said sidewall is circumferentially disposed at a first distance about a central axis of said base, and said protrusion of said sidewall is positioned a second distance from said central axis, wherein said second distance is greater than said first distance.

10. The apparatus as recited in claim 9, wherein said protrusion and said sidewall are a continuous, non-interrupted piece.

11. The apparatus as recited in claim 2, wherein said sidewall and said base are free of openings around an outer perimeter of said elastomeric sleeve.

12. The apparatus as recited in claim 2, wherein said elastomeric sleeve is configured to flexibly conform to a shape of a pan.

13. The baking apparatus as recited in claim 1, wherein said elastomeric sleeve includes a thermoplastic material.

14. The baking apparatus as recited in claim 1, wherein said elastomeric sleeve includes a thermoset material.

15. The baking apparatus as recited in claim 1, wherein said elastomeric sleeve includes an insulative material.

16. The baking apparatus as recited in claim 1, wherein said elastomeric sleeve includes a conductive material configured to conduct said heat to evenly distribute said heat throughout said batter.

17. The baking apparatus as recited in claim 1, wherein said elastomeric sleeve is water resistant and heat resistant.

18. The baking apparatus as recited in claim 1, wherein said springform pan and said container are unattached to one another.

19. The baking apparatus as recited in claim 1, wherein sidewalls of said springform pan and said elastomeric sleeve extend to equivalent heights.

20. A baking apparatus, comprising:
an elastomeric sleeve having a base, a sidewall that protrudes upwardly from said base, and a lip positioned on an opposite end of said sidewall from said base, wherein said sidewall establishes a protrusion, and said base, said sidewall and said protrusion are a single, continuous piece that define a reservoir;
a first handle and a second handle that extend from said lip in a direction away from said base;
a springform pan configured to receive a batter and being nested within said reservoir, said elastomeric sleeve flexibly conforming to a shape of said springform pan to evenly distribute heat throughout said batter; and
wherein said springform pan and said elastomeric sleeve are configured to be at least partially submerged into a water bath to cook said batter.

* * * * *